US006956579B1

(12) United States Patent
Diard et al.

(10) Patent No.: US 6,956,579 B1
(45) Date of Patent: Oct. 18, 2005

(54) PRIVATE ADDRESSING IN A MULTI-PROCESSOR GRAPHICS PROCESSING SYSTEM

(75) Inventors: Franck R. Diard, Mountain View, CA (US); Rick M. Iwamoto, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2 days.

(21) Appl. No.: 10/643,072

(22) Filed: Aug. 18, 2003

(51) Int. Cl.[7] .............................................. G06F 13/00
(52) U.S. Cl. ..................... 345/537; 345/502; 345/536; 345/538
(58) Field of Search ............................ 345/536–538, 345/541–543, 502–506; 711/130, 147–149, 711/153

(56) References Cited

U.S. PATENT DOCUMENTS 6,023,281 A * 2/2000 Grigor et al. ............... 345/543
6,473,086 B1 * 10/2002 Morein et al. .............. 345/505
6,724,390 B1 * 4/2004 Dragony et al. ............ 345/543
6,747,654 B1 * 6/2004 Laksono et al. ............ 345/502
6,781,590 B2 * 8/2004 Katsura et al. ............. 345/538

* cited by examiner

Primary Examiner—Matthew C. Bella
Assistant Examiner—Mackley Monestime
(74) Attorney, Agent, or Firm—Townsend and Townsend and Crew LLP

(57) ABSTRACT

Systems and methods for private addressing in a multi-processor graphics processing subsystem having a number of memories and a number of graphics processors. Each of the memories includes a number of addressable storage locations, and storage locations in different memories may share a common global address. Storage locations are uniquely identifiable by private addresses internal to the graphics processing subsystem. One of the graphics processors is able to access a location in a particular memory by referencing its private address.

29 Claims, 3 Drawing Sheets

PRIVATE ADDRESSING IN A MULTI-PROCESSOR GRAPHICS PROCESSING SYSTEM

CROSS-REFERENCES TO RELATED APPLICATIONS

The present disclosure is related to commonly-assigned co-pending U.S. patent application Ser. No. 10/642,905, filed on the same date as the present application, entitled "Adaptive Load Balancing in a Multiprocessor Graphics Processing System," which disclosure is incorporated herein by reference for all purposes.

BACKGROUND OF THE INVENTION

The present invention relates generally to graphics processing subsystems with multiple processors and in particular to private addressing for such graphics processing subsystems.

Graphics processing subsystems are designed to render realistic animated images in real time, e.g., at 30 or more frames per second. These subsystems are most often implemented on expansion cards that can be inserted into appropriately configured slots on a motherboard of a computer system and generally include one or more dedicated graphics processing units (GPUs) and dedicated graphics memory. The typical GPU is a highly complex integrated circuit device optimized to perform graphics computations (e.g., matrix transformations, scan-conversion and/or other rasterization techniques, texture blending, etc.) and write the results to the graphics memory. The GPU is a "slave" processor that operates in response to commands received from programs executing on a "master" processor, generally the central processing unit (CPU) of the system.

To meet the demands for realism and speed, some modern GPUs include more transistors than typical advanced CPUs. In addition, modern graphics memories have become quite large in order to improve speed by reducing traffic on the system bus; some cards now boast as much as 256 MB of memory. But despite these advances, a demand for even greater realism and faster rendering persists.

As one approach to meeting this demand, some manufacturers have begun to develop "multi-chip" graphics processing subsystems in which two or more GPUs operate in parallel on the same card. Parallel operation substantially increases the number of rendering operations that can be carried out per second without requiring significant advances in GPU design. To minimize resource conflicts between the GPUs, each GPU is generally provided with its own dedicated memory area (referred to herein as a "local memory").

Ideally, the size of this local memory is the same as the total memory size of a single-chip graphics subsystem; thus, for a two-chip card, it might be desirable to provide 512 MB (or more) of memory. Unfortunately, in conventional personal computer systems, the total memory of a multi-chip card can easily exceed the allotted address space for the graphics subsystem. For instance, one common addressing scheme provides a 4 GB global address space in which addresses can be expressed as 32-bit unsigned integers. Each expansion slot is allocated a specific 256-MB range within that address space. If a multi-chip card occupying one expansion slot includes 512 MB of memory, then not all of this memory can be assigned unique physical addresses. One solution is to design a "multi-card" subsystem that occupies two (or more) expansion slots, allowing each memory location to have its own address, but this is often undesirable, as expansion slots may be a limited resource and bus speeds may be too slow to support the needed rate of communication between the cards.

Another solution has been to permit duplication of memory address associations within the graphics subsystem. For example, if the local memory of each GPU includes 256 MB, one memory address can be mapped to a location in each of the local memories. This allows the CPU (or another external system component) to access the local memories in parallel. For example, in response to a write request, circuitry inside the graphics card can broadcast the data to each local memory. Read requests can also be handled by broadcasting the request to a set of memory interfaces, each associated with one of the local memories and configured to determine whether its associated local memory should respond to a given request.

While use of duplicate addresses does not prevent the CPU from accessing the graphics memory, the duplication makes it more difficult for any of the GPUs to access data stored in "remote" graphics memories (i.e., any graphics memory other than its own local memory). For example, in a two-chip card, an address in the first GPU's local memory is generally also an address in the remote memory (i.e., the second GPU's local memory). Since it is more often the case that the GPU wants to access its own local memory, the address is typically interpreted to refer to the local memory, not the remote memory.

In such systems, data transfers between different graphics memories generally require an indirect path. For example, data in a first graphics memory can be transferred to a location in an off-card memory (e.g., the main system memory), then transferred again from the off-card memory to a location in a second graphics memory. This process is undesirably slow because two transfers are involved and because the data has to be transmitted via the system bus twice: from the graphics card to the off-card memory, then from the off-card memory back to the graphics card.

It would, therefore, be desirable to enable direct transfers from one memory of a multi-chip graphics subsystem to another, without requiring that the data be transferred off the graphics card.

BRIEF SUMMARY OF THE INVENTION

Embodiments of the present invention provide systems and methods for private addressing in a multi-processor graphics processing subsystem. According to one aspect of the invention, a graphics processing subsystem for a computer system having a global address space includes a number of memories and a number of graphics processors. Each of the memories includes a number of addressable storage locations; a first storage location in a first one of the memories and a second storage location in a second one of the memories are addressable by a common global address in the global address space. A first one of the graphics processors is associated with the first memory. The first storage location in the first memory and the second storage location in the second memory are uniquely identifiable by respective first and second private addresses internal to the graphics processing subsystem. The first graphics processor is configured to access the second storage location in the second memory by referencing the second private address. In some embodiments, the first graphics processor may be further configured to access the first storage location in the first memory by referencing the common global address, or by referencing a local address, such as an offset.

According to another aspect of the invention, a graphics processing subsystem for a computer system having a global address space includes a first memory and a second memory, a first memory interface and a second memory interface, a first graphics processor and a second graphics processor, and a bridge unit. Each of the first memory and the second memory includes a plurality of addressable storage locations. The first memory interface and the second memory interface are coupled to the first memory and the second memory, respectively, and the first graphics processor and the second graphics processor are coupled to the first memory interface and the second memory interface, respectively. The bridge unit is coupled to each of the first and second memory interfaces and configured to assign a unique private address to each of the storage locations in each of the first and second memories. The first memory interface is configured to receive a first memory access request including an address from the first graphics processor, to respond to the first memory access request by accessing the first memory in the event that the address matches an address of a storage location in the first memory, and to forward the first memory access request to the bridge processor in the event that the address does not match an address of a storage location in the first memory. The bridge unit is further configured to process the first memory access request by accessing the second memory interface in the event that the address matches a private address of one of the storage locations in the second memory.

According to yet another aspect of the invention, a method is provided for accessing data in a graphics processing subsystem that has a first graphics processor and a second graphics processor coupled to a first memory and a second memory, respectively. A global address is assigned to each of a number of storage locations in the first memory and to each of a number of storage locations in the second memory, wherein a first storage location in the first memory and a second storage location in the second memory are assigned a common global address. A respective unique private addresses is also assigned to each of the storage locations in each of the first and second memories, wherein the private addresses are internal to the graphics processing subsystem. A first memory access request is received; this memory access request originates from the first graphics processor and references a target address that matches a private address of one of the storage locations in the second memory. A target storage location in the second memory is identified based on the matched private address, and the target storage location in the second memory is accessed.

According to a further aspect of the invention, a method is provided for accessing data in a graphics processing subsystem that has a first graphics processor and a second graphics processor coupled to a first memory and a second memory, respectively. A global address is assigned to each of a number of storage locations in the first memory and to each of a number of storage locations in the second memory, wherein a first storage location in the first memory and a second storage location in the second memory are assigned a common global address. A unique private address is also assigned to each of the storage locations in each of the first and second memories, wherein the private addresses are internal to the graphics processing subsystem. A data transfer request originating from the first graphics processor is received, the data transfer request referencing a source address that matches the common global address and referencing a destination address that matches a private address of one of the storage locations in the second memory. The first storage location in the first memory is identified as a source location, and a destination location in the second memory is identified based on the matched private address. A data transfer from the source location to the destination location is initiated.

According to a still further aspect of the invention, a method is provided for accessing data in a graphics processing subsystem that has a first graphics processor and a second graphics processor coupled to a first memory and a second memory, respectively. A global address is assigned to each of a number of storage locations in the first memory and to each of a number of storage locations in the second memory, wherein a first storage location in the first memory and a second storage location in the second memory are assigned a common global address. A unique private address is also assigned to each of the storage locations in each of the first and second memories, wherein the private addresses are internal to the graphics processing subsystem. A data transfer request originating from the first graphics processor is received, the data transfer request referencing a source address that matches a private address of one of the storage locations in the second memory and referencing a destination address that matches the common global address. A source storage location in the second memory is identified based on the matched private address, and the first storage location in the first memory is identified as a destination location. A data transfer from the source location to the destination location is initiated.

The following detailed description together with the accompanying drawings will provide a better understanding of the nature and advantages of the present invention.

DETAILED DESCRIPTION OF THE INVENTION

Embodiments of the present invention provide systems and methods for private addressing in a multi-processor graphics processing subsystem having a number of memories and a number of graphics processors. Each of the memories includes a number of addressable storage locations, and storage locations in different memories may share a common global address. Storage locations are uniquely identifiable by private addresses internal to the graphics processing subsystem. One of the graphics processors can access a location in a particular memory by referencing its private address.

Figure 1:
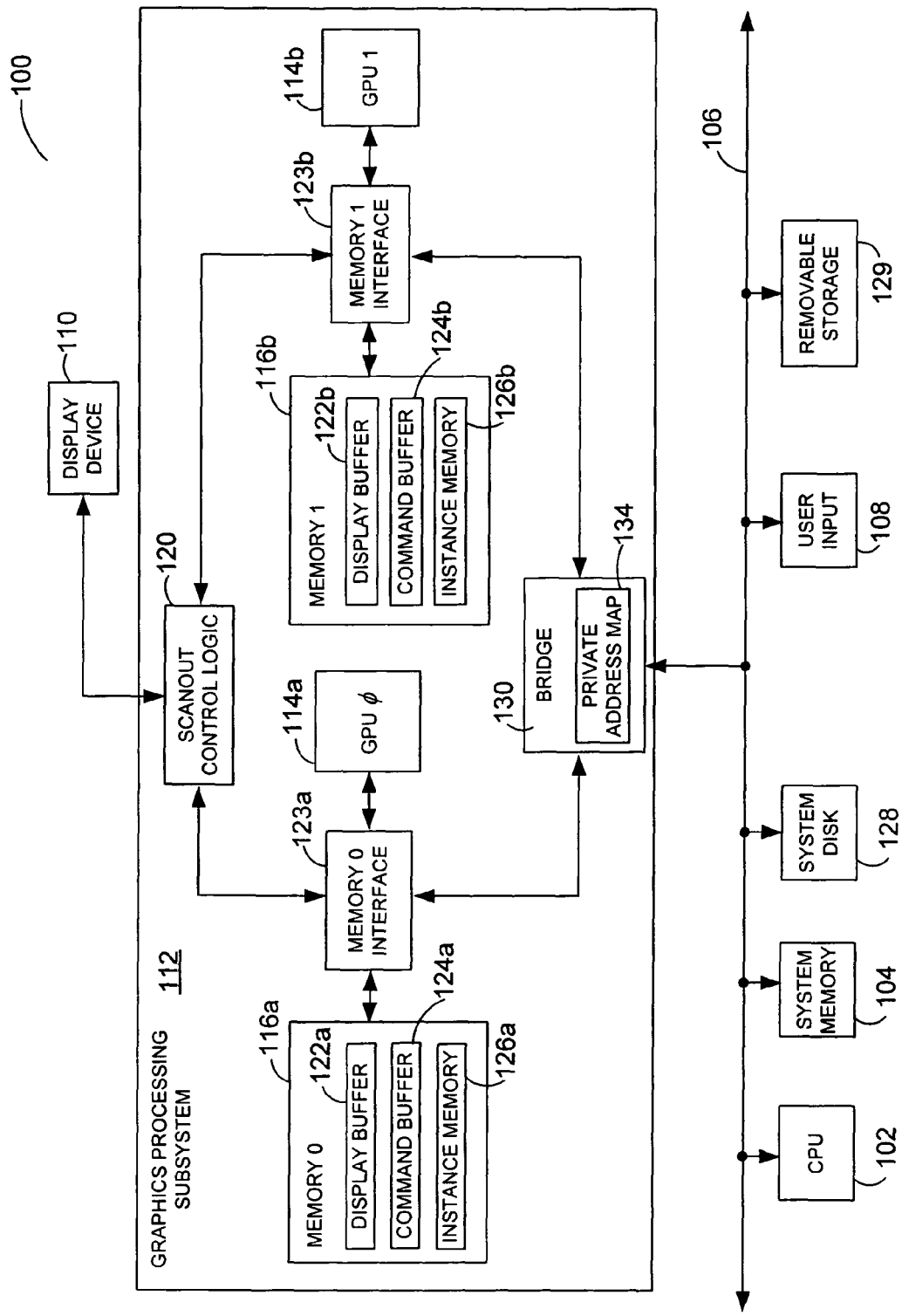
FIG. 1 is a simplified block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106.

Graphics processing subsystem 112 is advantageously implemented using a printed circuit card adapted to be connected to an appropriate bus slot (e.g., PCI or AGP) on a motherboard of system 100. In this embodiment, graphics processing subsystem 112 includes a bridge unit 130 and two (or more) graphics processing units (GPUs) 114a, 114b, each of which is preferably implemented as a separate integrated circuit device (e.g., programmable processor or application-specific integrated circuit (ASIC)). Bridge unit 130 manages communication between graphics processing subsystem 112 and other components of system 100, as described below. GPUs 114a, 114b are configured to perform various rendering functions in response to instructions received via system bus 106. In some embodiments, the rendering functions correspond to various stages of a graphics processing pipeline that converts geometry data describing a scene into pixel data displayable on display device 110. These functions can include, for example, lighting transformations, coordinate transformations, scan-conversion of geometric primitives to rasterized data, shading computations, shadow rendering, texture blending, and so on. Numerous implementations of rendering functions are known in the art and may be implemented in GPUs 114a, 114b. GPUs 114a, 114b are advantageously configured identically so that any graphics processing instruction can be executed by either GPU with substantially identical results.

Each GPU 114a, 114b, has an associated ("local") graphics memory 116a, 116b, which may be implemented using one or more memory circuit devices of generally conventional design. Graphics memories 116a, 116b may contain various physical or logical subdivisions, such as display buffers 122a, 122b; command buffers 124a, 124b; and instance memories 126a, 126b. Display buffers 122a, 122b store pixel data for an image (or for a part of an image) that is read by scanout control logic 120 and transmitted to display device 110 for display. This pixel data may be generated from graphics data provided to GPUs 114a, 114b via system bus 106 or generated by various processes executing on CPU 102 and provided to display buffers 122a, 122b via system bus 106. In some embodiments, display buffers 122a, 122b can be double buffered so that while data for a first image is being read for display from a "front" buffer, data for a second image can be written to a "back" buffer without affecting the currently displayed image. Command buffers 124a, 124b are used to queue commands received via system bus 106 for execution by respective GPUs 114a, 114b. Command buffers 124a, 124b are advantageously operated as first-in, first-out (FIFO) buffers so that commands are executed in the order in which they are received. Instance memories 126a, 126b are used to store references to memory addresses, as described below. Other portions of graphics memories 116a, 116b may be used to store data required by respective GPUs 114a, 114b (such as texture data, color lookup tables, etc.), executable program code for GPUs 114a, 114b, and so on.

For each graphics memory 116a, 116b, a memory interface 123a, 123b is also provided for controlling access to the respective graphics memory. Memory interfaces 123a, 123b can be integrated with respective GPUs 114a, 114b or with memories 116a, 116b, or they can be implemented as separate integrated circuit devices. In one embodiment, all memory access requests originating from GPU 114a are sent to memory interface 123a. If the target address of the request corresponds to a location in memory 116a, memory interface 123a accesses the appropriate location; if not, then memory interface 123a forwards the request to a bridge unit 130, which is described below. Memory interface 123a also receives all memory access requests targeting locations in memory 116a; these requests may originate from scanout control logic 120, CPU 102, or other system components, as well as from GPU 114a or 114b. Similarly, memory interface 123b receives all memory access requests that originate from GPU 114b or that target locations in memory 116b.

Bridge unit 130 is configured to manage communication between components of graphics processing subsystem 112 (including memory interfaces 123a, 123b) and other components of system 100. For example, bridge unit 130 may receive all incoming data transfer requests from system bus 106 and distribute (or broadcast) the requests to one or more of memory interfaces 123a, 123b. Bridge unit 130 may also receive data transfer requests originating from components of graphics processing subsystem 112 (such as GPUs 114a, 114b) that reference memory locations external to graphics processing subsystem 112 and transmit these requests via system bus 106. In addition, as described further below, bridge unit 130 facilitates access by either of GPUs 114a, 114b to the remote memory 116b, 116a associated with the other of GPUs 114a, 114b. (As used herein, the terms "local" and "remote" refer to the association, or lack thereof, between a particular GPU and a particular graphics memory and are not limiting as to physical locations of particular GPUs or memory devices. It is to be understood that both local and remote graphics memories may be present on the same graphics card. To avoid confusion, memory that is necessarily not on the graphics card is referred to herein as "off-card.")

Scanout control logic 120 reads pixel data for an image from frame buffers 122a, 122b and transfers the data to display device 110 to be displayed. Scanout can occur at a constant refresh rate (e.g., 80 Hz); the refresh rate can be a user selectable parameter and need not correspond to the rate at which new frames of image data are written to display buffers 122a, 122b. Scanout control logic 120 may also perform other operations such as adjustment of color values, generating composite screen images by combining the pixel data in either of the display buffers 122a, 122b with data for a video or cursor overlay image or the like obtained from either of graphics memories 116a, 116b or another data source (not shown), digital to analog conversion, and so on.

GPUs 114a, 114b are advantageously operated in parallel to increase the rate at which new frames of image data can be rendered. In one embodiment, referred to herein as "spatial parallelism," each GPU 114a, 114b generates pixel data for a different portion (e.g., a horizontal band) of each frame; scanout control logic 120 reads a first portion (e.g., the top half) of the image data for a frame from display buffer 122a and a second portion (e.g., the bottom half) from display buffer 122b. For spatial parallelism, rendering commands and accompanying data are typically written in parallel to both command buffers 124a, 124b (e.g., using a broadcast mode of bridge unit 130 described below), but commands and/or data can also be selectively written to one or more of the command buffers (e.g., different parameters for a command that defines the viewable area might be written to the different command buffers so that each GPU renders the correct portion of the image).

In another embodiment, referred to herein as "temporal parallelism," GPUs 114a, 114b render alternating frames. In this embodiment, scanout control logic 120 can read data for a first frame from display buffer 122a, data for a second frame from display buffer 122b, and so on. For temporal parallelism, rendering commands and accompanying data may be selectively written to the command buffer for the appropriate GPU, with the selection of GPU changing based on occurrences of a command indicating the end of a frame.

Memory addressing in system 100 will now be described. System 100 supports a global address space (e.g., a conventional PCI address space of 4 GB) for identifying available storage locations in the computer system, including storage locations on peripheral devices such as graphics processing subsystem 112. CPU 102 or other system components can use these physical addresses to transfer data to and from various storage locations (e.g., from system memory 104 to graphics memories 116a, 116b). For example, system bus 106 may be implemented on a motherboard that has expansion card slots (or other connectors) via which the various components are connected. Each slot can be allocated a range of addresses; e.g., graphics processing subsystem 112 may be implemented to connect to an expansion slot that has been allocated addresses in the range 0xC0000000 to 0xCFFFFFFF (in standard hexadecimal notation), so that unique addresses can be provided for up to 256 MB of graphics memory. The range of addresses allocated to graphics processing subsystem 112 is referred to herein as the "graphics range." It is to be understood that the size of the graphics range and particular address values included therein are usually determined by the system configuration and may vary for different computer systems; values given herein are illustrative.

In some embodiments, graphics processing subsystem 112 includes an amount of memory that exceeds the space provided by graphics range. For example, each of the graphics memories 116a, 116b may include 256 MB, for a total of 512 MB of graphics memory. With the address allocation described above, this would exceed the 256 MB of space in the graphics range. To enable access to graphics memories 116a, 116b by external components, each of graphics memories 116a, 116b can be mapped to the same 256 MB of the global address space, so that only 256 MB are visible to external components of system 100 (e.g., CPU 102).

Bridge unit 130 is advantageously configured to support this duplicate mapping by broadcasting memory access requests received via system bus 106 to both memory interfaces 123a, 123b. Memory interfaces 123a, 123b are advantageously configured such that each memory interface 123a (or 123b) recognizes all addresses in the graphics range and accesses a corresponding memory location in its respective memory 116a (116b). The same address is thus mapped to both of memories 116a, 116b. For example, in one embodiment, upon receiving a memory access request referencing an address "BASE+OFFSET" (where BASE is a base address for the graphics card, e.g., 0xC0000000, and OFFSET has any value less than the size of the graphics range, e.g., between 0 and 0x0FFFFFFF), bridge unit 130 forwards the request to both memory interfaces 123a, 123b. Memory interface 123a accesses the location corresponding to OFFSET in memory 116a while memory interface 123b accesses the location corresponding to OFFSET in memory 116b. In some embodiments, bridge unit 130 may also support a "multicast" mode, in which one or more registers included in bridge unit 130 can be loaded with values indicating which of the memory interfaces 123a, 123b is to receive a particular data transfer request.

In this embodiment, GPU 114a does not access memory 116b using an address in the graphics range. Any memory access request originating from GPU 114a is received first by memory interface 123a, which satisfies the request if the targeted address corresponds to a location in memory 116a and otherwise forwards the request to bridge unit 130 to be directed to some other system component. If memory interface 123a receives a request targeting an address within graphics memory 116b that duplicates an address in memory 116a, it will satisfy that request by accessing memory 116a. In other words, an address that exists in both memories 116a, 116b can be described as ambiguous; memory interface 123a resolves the ambiguity in favor of graphics memory 116a, and memory interface 123b resolves the ambiguity in favor of graphics memory 116b. Thus, GPU 114a (114b) can reliably use a duplicated address to access its own local memory 116a (116b) but not the remote memory 116b (116a).

In accordance with an embodiment of the present invention, a "private" address space is provided for use within graphics processing subsystem 112, enabling GPUs 114a, 114b to unambiguously identify locations in respective remote memories 116b, 116a. The private address space is large enough that each location in each of memories 116a, 116b can be mapped to a unique private address. For instance, if each of memories 116a, 116b has 256 MB of addressable storage, the private address space will provide addresses for at least 512 MB. The term "private" is used herein to indicate that the address space is used only by graphics processing subsystem 112; the private addresses need not be usable (or even recognizable as addresses) by components outside graphics processing subsystem 112. The private address space is advantageously managed by bridge unit 130, which can prevent memory access requests targeting a private address from being transmitted onto system bus 106.

More specifically, in one embodiment, bridge unit 130 includes a private address map 134 that is used to associate each location in each graphics memory 116a, 116b with a unique private address. Any format and any values may be used for private addresses, as long as bridge unit 130 can distinguish private addresses from global address that might be used to access other system components. In one embodiment, the private addresses have the same format as the global addresses (e.g., 32-bit numbers), but the private address values do not duplicate global addresses within the graphics range or the global address of any other component of system 100 that graphics processing subsystem 112 may need to access directly (e.g., system memory 104). Global addresses of components with which graphics processing subsystem 112 does not interact directly may be used. For example, addresses associated with a network card, audio card, or the like might be used as private address values. In one embodiment, a graphics driver program executing on CPU 102 identifies safe addresses during initialization of graphics processing subsystem 112 by excluding the physical (system) memory region and addresses mapped to graphics processing subsystem 112, then identifying the lowest block of contiguous addresses that is large enough to support a unique mapping of each location in graphics memories 116a, 116b.

In one embodiment, private addresses are assigned sequentially to each location in memory 116a, then sequentially to each location in memory 116b. In this embodiment, a (different) base private address can be assigned to each memory 116a, 116b; conversion between private addresses and global addresses can be done by subtracting the appropriate base private address and adding the base graphics address from the global memory space. In this embodiment, private address map 134 might include registers for storing the private and global base address values and arithmetic logic circuits for performing conversions from private to global addresses and vice versa. It will be appreciated that other rules for assigning private addresses may be implemented and that the private address values need not be consecutive. Private address map 134 may include any data storage and/or logic circuitry to support bidirectional conversions between private and global addresses.

GPU 114a (GPU 114b) can unambiguously identify any location in remote memory 116b (116a) by referencing the private address of that location (rather than the global address). For example, GPU 114a may request a data transfer from a source location in the remote memory 116b (identified by a private address) to a destination location in its local memory 116a (identified by a global address or just an offset value or, in some embodiments, by a private address). This request is received by memory interface 123a, which determines that the source address does not correspond to a location within graphics memory 116a and forwards the request to bridge unit 130 for processing. It should be noted that memory interface 123a need not recognize the source address as a private address. Bridge unit 130 recognizes the source address as a private address in memory 116b and directs the request to memory interface 123b, then directs data received in response back to memory interface 123a for storage in the destination location. Bridge unit 130 can convert the private source address to a physical (e.g., global) address before forwarding the request, so that memory interface 123b also need not recognize private addresses.

It will be appreciated that the system described herein is illustrative and that variations and modifications are possible. For instance, while two GPUs, with respective local memories, are shown, any number of GPUs can be used, and multiple GPUs might share a local memory. The memory interfaces described herein may be integrated with a GPU and/or a memory in a single integrated circuit device (chip) or implemented as separate chips. The bridge unit may be integrated with any of the memory interface and/or GPU chips, or may be implemented on a separate chip. The local memory for each GPU can be implemented using one or more integrated circuit devices. Graphics processing subsystems can be implemented using various expansion card formats, including PCI, PCI-X (PCI-Extended), AGP (Accelerated Graphics Port), and so on. Graphics processing subsystems might also be implemented without an expansion card, e.g., by mounting graphics processing components directly on a motherboard. Computer systems may also include various other components, such as high-speed DMA (direct memory access) chips, and a single system may implement multiple bus protocols (e.g., PCI and AGP buses may both be present) with appropriate components provided for interconnecting the buses. In the embodiment described above, all translation between global and private addresses is performed by a bridge unit of the graphics processing subsystem; other embodiments may enable GPUs and/or memory interfaces to perform such translations instead of or in addition to the bridge unit.

Figure 2:
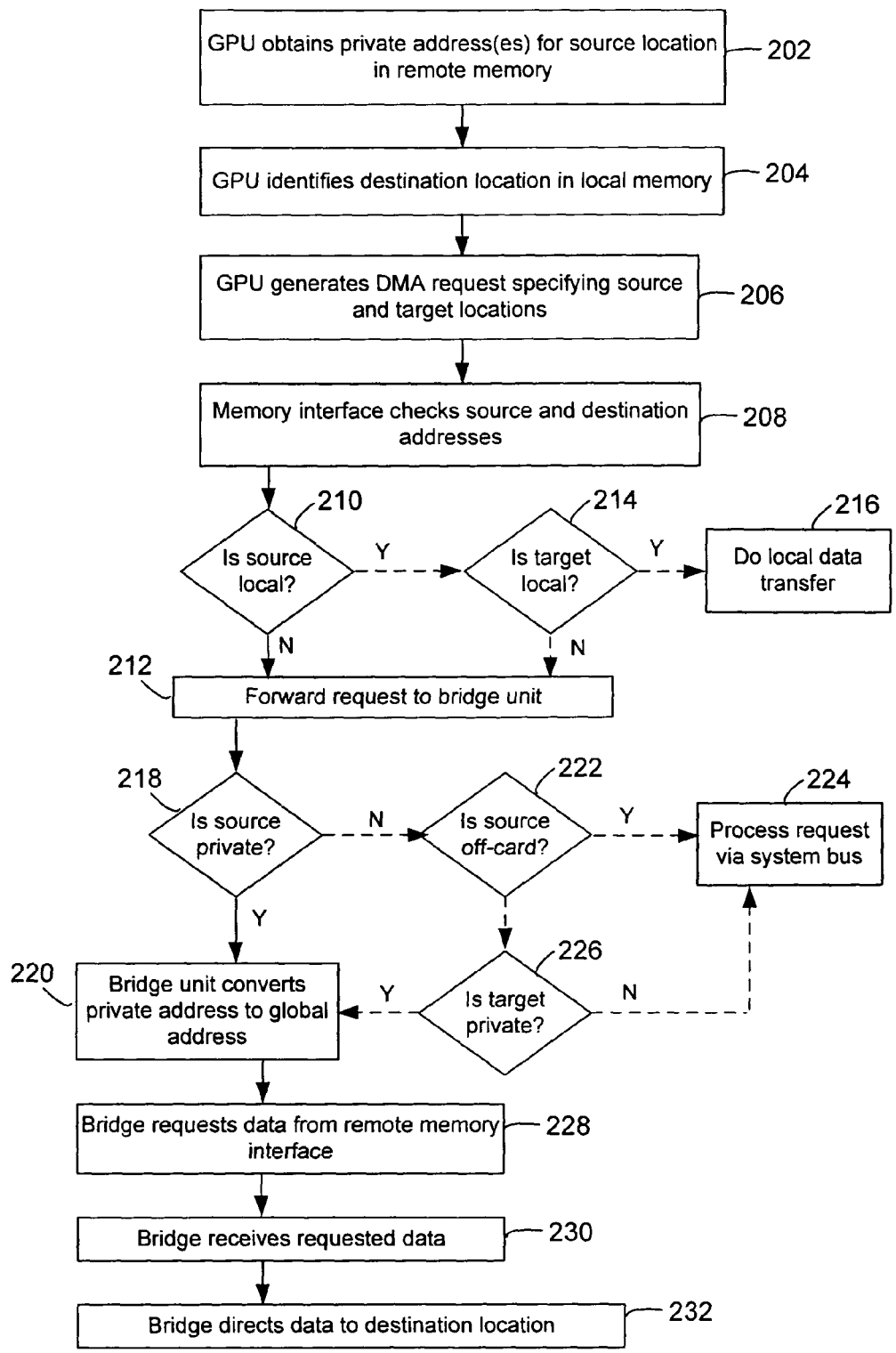
FIG. 2 is a flow diagram of a process for performing a data transfer operation according to an embodiment of the present invention.

Examples of processes for transferring data from one graphics memory to another in accordance with embodiments of the present invention will now be described. FIG. 2 is a flow diagram of a process 200 for a "pull" operation, in which GPU 114a of FIG. 1 initiates a transfer of data to a destination location in its local memory 116a from a source location in remote graphics memory 116b. The destination location is identified using its global address (in other embodiments, just an offset value or a private address might be used), while the source location is identified using a private address.

At step 202, GPU 114a obtains a private address for the source location in the remote memory 116b. The private address may be obtained in advance of any data transfer request (e.g., it may be provided at initialization) and stored in instance memory 126a of the local memory 116a.

In one embodiment, instance memory 126a stores objects called "handles," each of which identifies a particular window (i.e., a location or group of contiguous locations) in local graphics memory 116a, remote graphics memories 116b, and/or any other memory areas of system 100 (e.g., system memory 104). The identified window can include all of a memory area or any subset thereof, and different handles can identify overlapping windows. Each handle has a unique identifier (a name), a starting address for the window, and a window size. For example, instance memory 126a might store a handle for all of local memory 116a; its starting address would be the global base address of memory 116a and its window size would be equal to the size of memory 116a (e.g., 256 MB). In addition or alternatively, instance memory 126a might store a handle for just the display buffer 122a; its starting address would be the global address of the first location in display buffer 122a and its window size would be the size of the display buffer (e.g., 3 MB in one configuration).

As an example of remote memory handles, instance memory 126a might store a handle for all of remote memory 116b; the starting address would be the base private address of memory 116b. In addition or alternatively, instance memory 126a might store a handle for just the display buffer 122b of remote memory 116b; the starting address in this case would be the private address of the first location in the display buffer 122b. Instance memory 126a might also store handles for off-card memory areas, such as selected windows in system memory 104; the starting address for such handles would be the appropriate global address.

It is to be understood that the handles described herein are illustrative, and that handles may include other or different combinations of parameters (e.g., starting and ending addresses rather than starting address and window size). Handles are advantageously implemented such that handles to different types of memory can be used interchangeably. In some embodiments, handles to local memory may specify the starting address using just an offset value rather than the full global address.

Returning to process 200, when a data transfer from remote memory 116b to local memory 116a is desired, GPU 114a identifies a destination location in its local memory 116a (step 204). In some embodiments, the destination location is also identified using a handle (in this case the handle would identify a local memory window). Like the handle for the source location, a handle for the destination location may be created in advance of the transfer and stored in instance memory 126a.

At step 206, GPU 114a generates a DMA (direct memory access) request that identifies the source and destination locations, e.g., by reference to their respective handles. In some embodiments, the data block to be transferred need not correspond exactly to a window identified by a handle. For instance, the DMA request may identify the actual starting location of the data block by specifying an offset relative to the handle's starting address; the request may also specify a size of the block to be transferred (the size may be required to be not larger than the smaller of the window sizes of the source and destination handles). Allowing an offset and block size to be specified in a DMA request can reduce the number of handles that need to be created and stored in instance memory 126a but is not required.

The DMA request is sent to memory interface 123a. At step 208, memory interface 123a obtains the starting addresses for the source and destination handles from local memory 116a. At step 210, memory interface 123a determines whether the source handle identifies a local address (i.e., a location in local memory 1116a). In the case of a "pull" operation, the source handle is not local, and memory interface 123a forwards the request to bridge unit 130 (step 212). It should be noted that if the source had been local (shown by the dashed arrow at step 210), then at step 214, memory interface 123a would determine whether the destination handle also identified a local address; if so, then memory interface 123a would perform the transfer between locations in memory 116a (step 216) and the process would exit. If the source address was local but the target address was not, memory interface 123a would forward the request to bridge unit 130 (step 212). It should also be noted that process 200 does not require memory interface 123a to distinguish private addresses of remote graphics memory 116b from global addresses of off-card components; memory interface 123a only needs to distinguish local addresses (i.e., addresses within local memory 116a) and non-local addresses (i.e., anything else).

At step 212, as mentioned earlier, memory interface 123a forwards the request to bridge unit 130 for further processing. Before forwarding the request, memory interface 123a may replace the received references to source and destination handles with appropriate address and size values so that bridge unit 130 need not access memory 116a to obtain these values.

At step 218, bridge unit 130 determines whether the source address is a private address. For instance, bridge unit 130 may determine whether the source address falls within a range of values designated as private addresses in private address map 134. For the pull operation described herein, the source address is a private address, and bridge unit 130 proceeds to step 220. It should be noted that if the source address had not been a private address (shown by the dashed arrow at step 218), bridge unit 130 would determine whether the source address was an off-card address (step 222); if so, the request would be forwarded onto the system bus 106 to be processed (step 224), with bridge unit 130 routing any data received in response to the requesting memory interface 123a. If the source address had not been a private address or an off-card address (which would be the case, e.g., for a source address in local memory 116a), bridge unit 130 would check the destination address at step 226 and proceed to step 220 if the destination address is a private address. In the embodiment of FIG. 2, bridge unit 130 only receives a data transfer request if one of the source and destination addresses is not local to the requesting GPU. Accordingly, at step 226, if the destination address is not private, the only remaining possibility is that it is an off-card address, so bridge unit 130 would proceed to step 224, accessing the system bus to complete the request. In alternative embodiments, bridge unit 130 might be implemented to receive data transfer requests that include other combinations of local and non-local addresses (e.g., two private addresses, or a private address and an off-card address, or two local addresses); implementation of appropriate steps to detect each possible combination will be straightforward to those of ordinary skill in the art with access to the present disclosure.

At step 220, bridge unit 130 converts the private address to a global address located within remote graphics memory 116b, e.g., by using private memory map 134 to look up a corresponding global address or to subtract and/or add appropriate base address values as described above. At step 228, bridge unit 130 sends a request to memory interface 123b to begin reading data from remote memory 116b; the request may specify the global address (or offset) of the starting location and the size of the block to be transferred. At step 230, memory interface 123b returns data to bridge unit 130, which directs the incoming data to memory interface 123a at step 232. It should be noted that bridge unit 130 is able to determine the source of each request and therefore to resolve any ambiguity in the destination address; for instance, any data received in response to a pull request from memory interface 123a should be routed to memory interface 123a. In some embodiments, bridge unit 130 and/or memory interface circuits 123a, 123b may include dedicated DMA hardware to manage the transfer operation without requiring data to be stored in intermediate registers.

It will be appreciated that the process described herein is illustrative and that variations and modifications are possible. Steps described as sequential may be executed in parallel, order of steps may be varied, and steps may be modified or combined. For example, in an alternative embodiment, memory interfaces 123a, 123b may be capable of distinguishing private (on-card) addresses from off-card addresses and/or may be capable of recognizing private addresses corresponding to their respective local memories 116a, 116b so that all addressing within the graphics processing subsystem might be done using private addresses. It is to be understood that GPU 114b can also initiate a pull operation to transfer data from memory 116a to memory 116b using similar operations. Similar steps may be implemented to implement a "push" operation in which GPU 114a (114b) initiates a data transfer from its local memory 116a (116b) to remote memory 116b (116a). In the event that more than two memories are present, each memory has a unique set of private addresses so that the bridge unit can readily select the correct memory for handling a particular request. In some embodiments, a GPU only generates data transfer requests that involve its local memory (that is, at least one of the source and destination locations is local), but this is not required.

In some instances where data is transferred between memories 116a and 116b, it may be desirable to synchronize the transfer with operations of one or the other GPU. For example, GPU 114a may desire to push data from display buffer 122a of memory 116a to display buffer 122b of memory 116b. The push operation might conflict with updates to the display buffer 122b being made by GPU 114b, which may result in tearing and other undesirable artifacts in a displayed image. To prevent such conflicts, a data transfer operation initiated by GPU 114a can be synchronized with operations of GPU 114b (or vice versa). In one embodiment of the present invention, such synchronization is supported using semaphores. A semaphore, in this context, may be implemented using a designated location in memory that provides access control for another ("protected") location in memory. For example, the semaphore location can store a value indicating which GPU has rights to access the protected location, or a value indicating whether the protected location is currently in use. Memory access requests targeting the protected location are processed by first checking the state (e.g., value) of the semaphore; access to the protected location is allowed or denied based on the state of the semaphore. When a request is denied, the requesting process can wait until the state of the semaphore changes. In some embodiments of the present invention, the semaphore location may be in one of the graphics memories; e.g., graphics memory 116a (116b) can store semaphores for protected locations in memory 116a (116b) or vice versa. Whichever GPU is non-local to the memory that stores the semaphore can access the semaphore using a DMA operation that references the private address of the semaphore.

Figure 3:
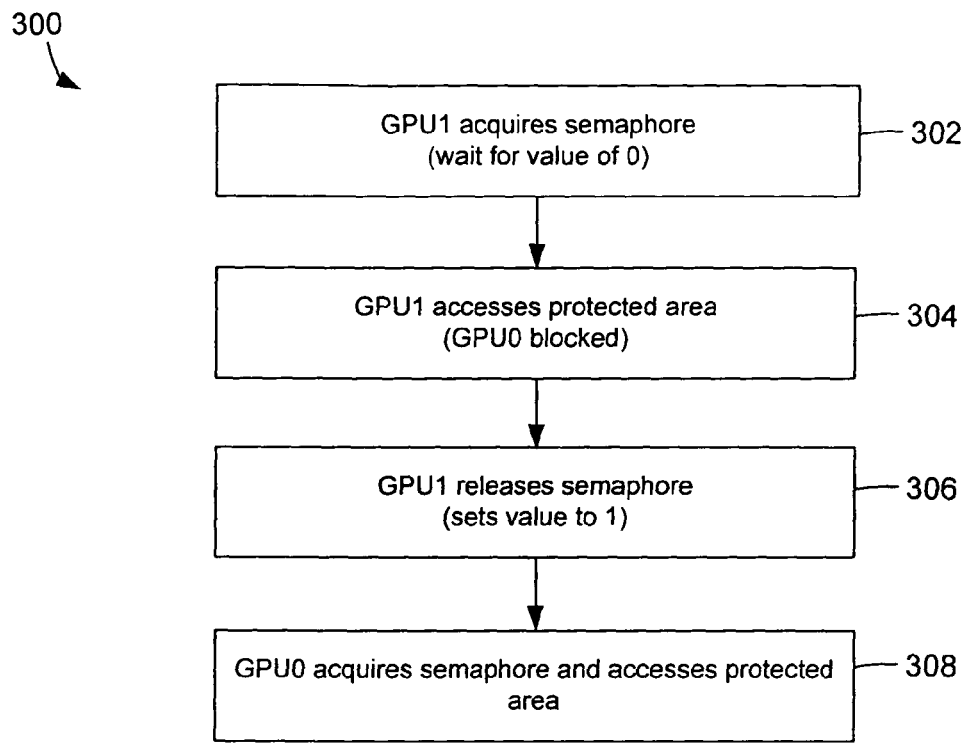
FIG. 3 is a flow diagram of a process for protecting a memory resource using a semaphore according to an embodiment of the present invention.

FIG. 3 is a flow diagram of a process 300 for synchronization using a semaphore. In this example, a region in memory 116b is protected by a semaphore that is also stored in memory 116b. At step 302, GPU 114b acquires the semaphore when its value is 0, indicating that the protected region is accessible to GPU 114b. At step 304, GPU 114b accesses the protected area, reading and/or writing data as desired.

GPU 114a cannot acquire the semaphore because the value 0 indicates that the protected region is not available to GPU 114a. GPU 114a can attempt to acquire the semaphore by referencing a private address associated with the location of the semaphore in memory 116b. The value 0 stored in the semaphore causes the attempt to fail. In some embodiments, checking of the semaphore value is done by GPU 114a; in other embodiments, memory interface 123b performs the check in response to a request for the semaphore and returns a result indicating that the request to acquire the semaphore failed.

At step 306, GPU 114b completes its access operations and releases the semaphore, setting its value to 1. Thereafter, at step 308, GPU 114a acquires the semaphore and accesses the protected area to read or write data.

It will be appreciated that process 300 is illustrative and that variations and modifications are possible. Steps described as sequential may be executed in parallel, order of steps may be varied, and steps may be modified or combined. The semaphore may be stored in the same one of graphics memories 116a, 116b as the protected area, in a different graphics memory, or in off-card memory (e.g., main system memory). GPU 114a can use private addresses to access semaphores and/or protected areas in memory 116b, while GPU 114b uses local addresses to access the same locations.

By way of illustration, some specific applications of the private addressing methods of process 200 in the context of system 100 will now be described. It will be appreciated that these are merely examples and that the methods and systems described herein may be employed in any situation in which it is desirable to move data from one memory device to another within a graphics processing system.

Figure 4:
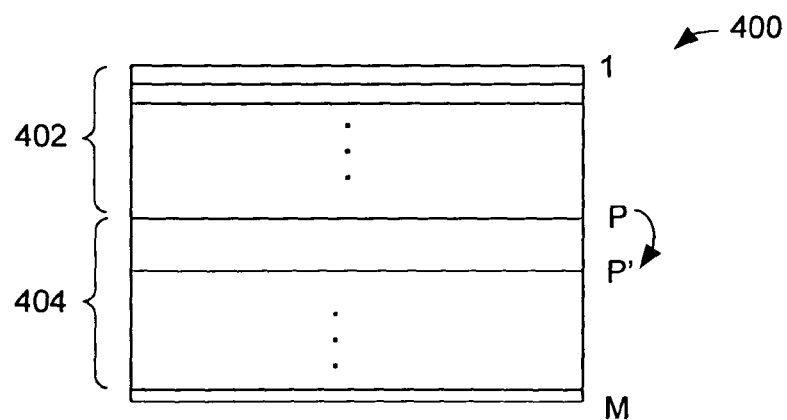
FIG. 4 is an illustration of a display area showing spatial parallelism.

As one example, data may be transferred from one graphics memory to another in conjunction with load balancing among the GPUs in a system where spatial parallelism is implemented. FIG. 4 illustrates a display frame 400 consisting of M lines (i.e., horizontal rows) of pixel data. Lines 1 through P (corresponding to top portion 402 of frame 400) are rendered by GPU 114a of FIG. 1, while lines P+1 through M (corresponding to bottom portion 404 of frame 400) are rendered by GPU 114b. In this embodiment, each GPU 114a, 114b allocates a display buffer 122a, 122b in its local memory 116a, 116b that is large enough to store an entire frame (M lines) of data but only fills the lines it renders (lines 1 through P for GPU 114a and lines P+1 through M for GPU 114b). Scanout control logic 120 reads the first P lines from display buffer 122a, then switches to display buffer 122b to read lines P+1 through M.

In load-balancing embodiments, the value of P is adjusted from time to time so that the computational burden is shared equally between the two GPUs. This increases efficiency by avoiding situations where one GPU finishes a frame and then is idle for a significant period while the other GPU continues to process the frame. For example, if complex foregrounds are being rendered in bottom portion 404 of frame 400 while simple backgrounds are being rendered in top portion 402, it may be desirable to set P to a value larger than M/2, so that bottom portion 404 includes fewer lines than top portion 402, thereby redistributing the computational burden more equally between GPUs 114a, 114b and reducing idle time. Various techniques can be used to determine a suitable value of P; examples are described in the above cross-referenced co-pending application Ser. No. 10/642,905.

Regardless of the particular load balancing technique used, when the value P of the dividing line changes, it is useful to transfer lines of data from one display buffer to another. For example, in FIG. 4, suppose that just after GPUs 114a, 114b have finished rendering a current frame, the value of P is changed to P', increasing the number of lines for which GPU 1114a is responsible in the next frame. GPU 114a may need data for lines P to P' of the current frame in order to correctly process the next frame. In accordance with process 200, GPU 114a can obtain the data by a DMA transfer using the private address for the portion of display buffer 122b that has the data for lines P+1 to P'. It should be noted that in the absence of private addressing, a direct transfer would not be possible; the data for lines P+1 to P' would have to be transferred from display buffer 122b to an off-card location (e.g., system memory 104) and then back to display buffer 122a.

As another example, data may be transferred from one display buffer to another in systems where temporal parallelism is implemented. For example, in system 100 of FIG. 1, GPUs 114a and 114b can be configured to render alternating frames; that is, GPU 114a renders a first frame, GPU 114b renders a second frame, GPU 114a renders a third frame, and so on. GPU 114b can start rendering the second frame before GPU 114a finishes the first frame, resulting in some acceleration. In the course of rendering the second frame, GPU 114b may need texture data (or other data) that was generated by GPU 114a during the first frame. Rather than having GPU 114b regenerate the same texture data, GPU 114a can be instructed to push the texture data from memory 116a into memory 116b after generating it. In one such embodiment, the push instruction is inserted into the instruction stream for GPU 114a by a graphics driver program executing on CPU 102. It will be appreciated that, while GPU 114b could also be instructed to initiate a transfer to pull the data into its local memory 116b, instructing GPU 14a to initiate the transfer reduces the likelihood of synchronization errors since GPU 114a will not initiate the transfer until it has finished generating the data.

More generally, private addressing can be used in any situation in a multi-processor graphics processing system in which data generated by one GPU is to be used by another GPU. For example, in FIG. 4, suppose that the image in top portion 402 of frame 400 includes a mirror oriented so as to reflect an object that appears in bottom portion 404 of frame 400. GPU 114a, which renders top portion 402, can obtain pixel data for the object (e.g., pixel data to use in a texture map) from memory 116b by a memory access operation targeting that portion of display buffer 122b (e.g., a DMA transfer operation to pull the data). Alternatively, GPU 114b can be instructed to push the data to memory 116a for use by GPU 114a.

As these examples illustrate, private addressing can expand the DMA capability of a multi-processor graphics processing subsystem, enabling direct data transfers between different memory devices within the graphics processing subsystem without enlarging the footprint of the graphics processing subsystem in the system's physical memory space.

While the invention has been described with respect to specific embodiments, one skilled in the art will recognize that numerous modifications are possible. For instance, any number of GPUs may be included on a graphics card, and each may have its own local memory, and a single bridge unit may support any number of GPUs. Each location in each local memory may be assigned a unique private address so that any GPU may transfer data to or from any memory on the graphics card without sending data over the system bus.

The private address may have any format as long as the bridge unit is able to distinguish a private address from an off-card address and reliably identify the memory location associated with any private address. In some embodiments, instead of creating private addresses for every memory location, private addresses might be created and associated with memory locations on an as-needed basis. In general, private addresses need not be in the same sequence as physical location addresses, although in some embodiments it is convenient to arrange private addresses to match the sequencing of physical addresses.

Uses of private addressing are not limited to the particular examples mentioned herein; private addressing may be used in any situation in which it is desired to transfer data from one memory of a graphics card to another memory of the same graphics card, and any combination of push and pull operations may be supported in particular embodiments. Private addressing might also be implemented in a network of GPUs, implemented on multiple cards as long as the network of GPUs is implemented such that the private addresses transmitted between the GPUs are not visible to other system components. In addition, it is to be understood that embodiments of the invention are not limited to data transfer operations from one graphics memory to another; any type of memory access request may use a private address (e.g., a GPU may read data from a remote memory into a register and/or write data from a register to a remote memory).

Embodiments of the invention may be implemented using special-purpose hardware, software executing on general-purpose or special-purpose processors, or any combination thereof. The embodiments have been described in terms of functional blocks that might or might not correspond to separate integrated circuit devices in a particular implementation. Although embodiments described herein may refer to a general-purpose computing system, those of ordinary skill in the art with access to the present disclosure will recognize that the invention may be employed in a variety of other embodiments, including special-purpose computing systems such as video game consoles or any other computing system that provides graphics processing capability.

Thus, although the invention has been described with respect to specific embodiments, it will be appreciated that the invention is intended to cover all modifications and equivalents within the scope of the following claims.

What is claimed is:

1. A graphics processing subsystem for a computer system having a global address space, the graphics processing subsystem comprising:

a plurality of memories including a first memory and a second memory, each of the plurality of memories including a plurality of addressable storage locations, wherein a first storage location in the first memory and a second storage location in the second memory are addressable by a common global address in the global address space; and a plurality of graphics processors including a first graphics processor associated with the first memory, wherein the first storage location in the first memory and the second storage location in the second memory are uniquely identifiable by respective first and second private addresses internal to the graphics processing subsystem, and wherein the first graphics processor is configured to access the second storage location in the second memory by referencing the second private address.

2. The graphics processing subsystem of claim 1, wherein the first graphics processor is further configured to access the first storage location in the first memory by referencing the common global address.

3. The graphics processing subsystem of claim 1, wherein the first graphics processor is further configured to access the first storage location in the first memory by referencing a local address.

4. The graphics processing subsystem of claim 3, wherein the local address includes an offset value.

5. The graphics processing subsystem of claim 1, further comprising:

a bridge unit coupled to the plurality of memories and configured to convert private addresses of the storage locations to global addresses.

6. The graphics processing subsystem of claim 5, wherein the bridge unit is further configured to communicate with a system bus of the computer system.

7. The graphics processing subsystem of claim 6, wherein the bridge unit is further configured to receive a memory access request that originates from one of the plurality of graphics processors and references a global address that does not correspond to any of the storage locations in the plurality of memories and to respond to the memory access request by communicating with the system bus.

8. The graphics processing subsystem of claim 6, wherein the bridge unit is further configured to receive a memory access request via the system bus, the memory access request referencing the common global address, and to broadcast the memory access request to the first memory and the second memory.

9. The graphics processing subsystem of claim 5, further comprising:

a first memory interface coupled between the first graphics processor and the first memory and configured to receive a memory access request from the first graphics processor, wherein the first memory interface is further configured to respond to the memory access request by accessing the first memory in the event that the memory access request references the common global address.

10. The graphics processing subsystem of claim 9, wherein the first memory interface is further configured to forward the memory access request to the bridge unit in the event that the memory access request references an address other than an address of one of the storage locations in the first memory.

11. The graphics processing subsystem of claim 5, wherein the plurality of graphics processors further includes a second graphics processor associated with the second memory,
wherein the second graphics processor is configured to access the first storage location in the first memory by referencing the first private address.

12. The graphics processing subsystem of claim 11, wherein the second graphics processor is further configured to access the first storage location in the second memory by referencing the common global address.

13. The graphics processing subsystem of claim 11, wherein the second graphics processor is further configured to access the first storage location in the second memory by referencing a local address.

14. The graphics processing subsystem of claim 13, wherein the local address includes an offset value.

15. A graphics processing subsystem for a computer system having a global address space, the graphics processing subsystem comprising:
a first memory and a second memory, each including a plurality of addressable storage locations;
a first memory interface and a second memory interface coupled to the first memory and the second memory, respectively;
a first graphics processor and a second graphics processor coupled to the first memory interface and the second memory interface, respectively; and
a bridge unit coupled to each of the first and second memory interfaces and configured to assign a unique private address to each of the storage locations in each of the first and second memories,
wherein the first memory interface is configured to receive a first memory access request including an address from the first graphics processor, to respond to the first memory access request by accessing the first memory in the event that the address matches an address of a storage location in the first memory, and to forward the first memory access request to the bridge unit in the event that the address does not match an address of a storage location in the first memory, and
wherein the bridge unit is configured to process the first memory access request by accessing the second memory interface in the event that the address matches a private address of one of the storage locations in the second memory.

16. The graphics processing subsystem of claim 15, wherein the bridge unit is further configured to process the first memory access request by accessing a system bus of the computer system in the event that the address does not match a private address of one of the storage locations in the second memory.

17. The graphics processing subsystem of claim 15, wherein the second memory interface is configured to receive a second memory access request including an address from the second graphics processor, to respond to the second memory access request by accessing the second memory in the event that the address matches an address of a storage location in the second memory, and to forward the second memory access request to the bridge unit in the event that the address does not match an address of a storage location in the second memory.

18. The graphics processing subsystem of claim 17, wherein the bridge unit is configured to process the second memory access request by accessing the first memory interface in the event that the address matches a private address of one of the storage locations in the first memory.

19. A method for accessing data in a graphics processing subsystem that has a first graphics processor and a second graphics processor coupled to a first memory and a second memory, respectively, the method comprising:
assigning a global address to each of a plurality of storage locations in the first memory and to each of a plurality of storage locations in the second memory, wherein a first storage location in the first memory and a second storage location in the second memory are assigned a common global address;
assigning a respective unique private address to each of the storage locations in each of the first and second memories, wherein the private addresses are internal to the graphics processing subsystem;
receiving a first memory access request originating from the first graphics processor and referencing a target address that matches a private address of one of the storage locations in the second memory;
identifying a target storage location in the second memory based on the matched private address; and
accessing the target storage location in the second memory.

20. The method of claim 19, further comprising:
receiving a second memory access request originating from the second graphics processor and referencing a target address that matches a private address of one of the storage locations in the first memory;
identifying a target storage location in the first memory based on the matched private address; and
accessing the target storage location in the first memory.

21. The method of claim 19, further comprising:
receiving a second memory access request originating from the first graphics processor and referencing the common global address; and
responding to the second memory access request by accessing the first storage location in the first memory.

22. The method of claim 21, further comprising:
receiving a third memory access request originating from the second graphics processor and referencing the common global address; and
responding to the third memory access request by accessing the second storage location in the second memory.

23. The method of claim 19, further comprising:
receiving a second memory access request that originates from one of the first and second graphics processors and references a global address that does not correspond to any of the storage locations in the first and second memories; and
responding to the memory access request by accessing the system bus.

24. The method of claim 19, further comprising:
receiving a second memory access request via the system bus, the memory access request referencing the common global address; and
broadcasting the second memory access request to the first memory and the second memory.

25. The method of claim 19, wherein the identified storage location is protected by a semaphore, the method further comprising:
acquiring the semaphore prior to accessing the identified storage location; and
releasing the semaphore after accessing the identified storage location,
wherein after acquiring the semaphore and before releasing the semaphore, access to the identified storage location by the second graphics processor is not permitted.

26. The method of claim 25, wherein the semaphore is stored in a semaphore storage location in the second memory.

27. The method of claim 25, wherein the semaphore is stored in a semaphore storage location in the first memory.

28. A method for accessing data in a graphics processing subsystem that has a first graphics processor and a second graphics processor coupled to a first memory and a second memory, respectively, the method comprising:

assigning a global address to each of a plurality of storage locations in the first memory and to each of a plurality of storage locations in the second memory, wherein a first storage location in the first memory and a second storage location in the second memory are assigned a common global address;

assigning a unique private address to each of the storage locations in each of the first and second memories, wherein the private addresses are internal to the graphics processing subsystem;

receiving a data transfer request originating from the first graphics processor, the data transfer request referencing a source address that matches the common global address and referencing a destination address that matches a private address of one of the storage locations in the second memory;

identifying as a source location the first storage location in the first memory;

identifying a destination location in the second memory based on the matched private address; and initiating a data transfer from the source location to the destination location.

29. A method for accessing data in a graphics processing subsystem that has a first graphics processor and a second graphics processor coupled to a first memory and a second memory, respectively, the method comprising:

assigning a global address to each of a plurality of storage locations in the first memory and to each of a plurality of storage locations in the second memory, wherein a first storage location in the first memory and a second storage location in the second memory are assigned a common global address;

assigning a unique private address to each of the storage locations in each of the first and second memories, wherein the private addresses are internal to the graphics processing subsystem;

receiving a data transfer request originating from the first graphics processor, the data transfer request referencing a source address that matches a private address of one of the storage locations in the second memory and referencing a destination address that matches the common global address;

identifying a source storage location in the second memory based on the matched private address;

identifying as a destination location the first storage location in the first memory; and initiating a data transfer from the source location to the destination location.

* * * * *